US010326741B2

(12) United States Patent
Rothstein et al.

(10) Patent No.: US 10,326,741 B2
(45) Date of Patent: *Jun. 18, 2019

(54) SECURE COMMUNICATION SECRET SHARING

(71) Applicant: ExtraHop Networks, Inc., Seattle, WA (US)

(72) Inventors: Jesse Abraham Rothstein, Seattle, WA (US); Benjamin Thomas Higgins, Shoreline, WA (US); Brian David Hatch, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,886

(22) Filed: Mar. 13, 2017

(65) Prior Publication Data

US 2018/0034783 A1    Feb. 1, 2018

Related U.S. Application Data

(63) Continuation of application No. 15/150,354, filed on May 9, 2016, now Pat. No. 9,621,523, which is a
(Continued)

(51) Int. Cl.
*H04L 29/06* (2006.01)
*H04L 12/26* (2006.01)

(52) U.S. Cl.
CPC ...... *H04L 63/0428* (2013.01); *H04L 43/0876* (2013.01); *H04L 63/061* (2013.01); *H04L 67/42* (2013.01); *H04L 63/166* (2013.01)

(58) Field of Classification Search
CPC ................................................. H04L 63/0428
See application file for complete search history.

(56) References Cited

U.S. PATENT DOCUMENTS 5,430,727 A    7/1995 Callon
5,541,995 A    7/1996 Normile et al.
(Continued)

FOREIGN PATENT DOCUMENTS

EP    3089424 A1    2/2016
EP    3113443 A1    4/2017

OTHER PUBLICATIONS

Communication and Search Report for European Patent Application No. 16166907.2 dated Sep. 30, 2016, 7 pages.
(Continued)

*Primary Examiner* — William S Powers
(74) *Attorney, Agent, or Firm* — John W. Branch; Lowe Graham Jones PLLC

(57) ABSTRACT

Embodiments are directed to sharing secure communication secrets with a network monitoring device (NMD). The NMD may passively monitor network packets communicated between client computers and server computers. If a secure communication session is established between a client computer and a server computer, a key provider may provide the NMD a session key that corresponds to the secure communication session. The NMD may buffer each network packet associated with the secure communication session until the NMD is provided a session key for the secure communication session. The NMD may use the session key to decrypt network packets communicated between the client computer and the server computer. The NMD may then proceed to analyze the secure communication session based on the contents of the decrypted network packets.

20 Claims, 9 Drawing Sheets

Related U.S. Application Data continuation of application No. 14/695,690, filed on Apr. 24, 2015, now Pat. No. 9,338,147.

(56) References Cited

U.S. PATENT DOCUMENTS

| | | | |
|---|---|---|---|
| 5,787,237 | A | 7/1998 | Reilly |
| 5,802,599 | A | 9/1998 | Cabrera et al. |
| 5,835,726 | A | 11/1998 | Shwed et al. |
| 6,141,686 | A | 10/2000 | Jackowski et al. |
| 6,401,150 | B1 | 6/2002 | Reilly |
| 6,765,909 | B1 | 7/2004 | Sen et al. |
| 6,807,156 | B1 | 10/2004 | Veres et al. |
| 6,948,060 | B1 | 9/2005 | Ramanathan |
| 7,089,326 | B2 | 8/2006 | Boucher et al. |
| 7,193,968 | B1 | 3/2007 | Kapoor et al. |
| 7,313,141 | B2 | 12/2007 | Kan et al. |
| 7,480,292 | B2 | 1/2009 | Busi et al. |
| 7,543,146 | B1 * | 6/2009 | Karandikar ............ G06F 21/33 713/175 |
| 7,545,499 | B2 | 6/2009 | Overbeck et al. |
| 7,602,731 | B2 | 10/2009 | Jain |
| 7,724,905 | B2 | 5/2010 | Bleumer et al. |
| 7,864,764 | B1 | 1/2011 | Ma et al. |
| 7,975,139 | B2 | 7/2011 | Coulier |
| 7,979,555 | B2 | 7/2011 | Rothstein et al. |
| 7,979,694 | B2 | 7/2011 | Touitou et al. |
| 8,079,083 | B1 | 12/2011 | Bennett et al. |
| 8,107,397 | B1 | 1/2012 | Bagchi et al. |
| 8,125,908 | B2 | 2/2012 | Rothstein et al. |
| 8,185,953 | B2 | 5/2012 | Rothstein et al. |
| 8,352,725 | B1 * | 1/2013 | O'Toole, Jr. ............ H04L 63/20 713/151 |
| 8,411,677 | B1 | 4/2013 | Colloff |
| 8,533,254 | B1 | 9/2013 | Whitson, Jr. et al. |
| 8,619,579 | B1 | 12/2013 | Rothstein et al. |
| 8,627,422 | B2 | 1/2014 | Hawkes et al. |
| 8,707,440 | B2 | 4/2014 | Deraison et al. |
| 8,782,393 | B1 | 7/2014 | Rothstein et al. |
| 2002/0024964 | A1 | 2/2002 | Baum et al. |
| 2002/0080720 | A1 | 6/2002 | Pegrum et al. |
| 2002/0091844 | A1 | 7/2002 | Craft et al. |
| 2002/0097724 | A1 | 7/2002 | Halme et al. |
| 2002/0199098 | A1 | 12/2002 | Davis |
| 2003/0014628 | A1 | 1/2003 | Freed et al. |
| 2003/0084279 | A1 * | 5/2003 | Campagna ............ H04L 43/00 713/153 |
| 2003/0152094 | A1 | 8/2003 | Colavito et al. |
| 2003/0156715 | A1 | 8/2003 | Reeds et al. |
| 2003/0204621 | A1 | 10/2003 | Poletto et al. |
| 2003/0214913 | A1 | 11/2003 | Kan et al. |
| 2004/0003094 | A1 | 1/2004 | See |
| 2004/0047325 | A1 | 3/2004 | Hameleers et al. |
| 2004/0073512 | A1 | 4/2004 | Maung |
| 2004/0038557 | A1 | 5/2004 | Malcolm et al. |
| 2004/0093513 | A1 | 5/2004 | Cantrell et al. |
| 2004/0250059 | A1 | 12/2004 | Ramelson et al. |
| 2005/0050316 | A1 | 3/2005 | Peles |
| 2005/0060427 | A1 | 3/2005 | Phillips et al. |
| 2005/0091341 | A1 | 4/2005 | Knight et al. |
| 2005/0091357 | A1 | 4/2005 | Krantz et al. |
| 2005/0100000 | A1 | 5/2005 | Faulkner et al. |
| 2005/0125684 | A1 * | 6/2005 | Schmidt ............ H04L 9/30 726/27 |
| 2005/0182833 | A1 | 8/2005 | Duffie et al. |
| 2005/0210242 | A1 | 9/2005 | Troxel et al. |
| 2006/0029096 | A1 | 2/2006 | Babbar et al. |
| 2006/0045017 | A1 | 3/2006 | Yamasaki |
| 2006/0123477 | A1 | 6/2006 | Raghavan et al. |
| 2006/0191009 | A1 | 8/2006 | Ito et al. |
| 2007/0088845 | A1 | 4/2007 | Memon et al. |
| 2007/0156919 | A1 | 7/2007 | Potti et al. |
| 2007/0169190 | A1 | 7/2007 | Kolton et al. |
| 2007/0192863 | A1 | 8/2007 | Kapoor et al. |
| 2008/0062995 | A1 | 3/2008 | Kaas |
| 2008/0069002 | A1 | 3/2008 | Savoor et al. |
| 2008/0130659 | A1 | 6/2008 | Polland |
| 2008/0141275 | A1 | 6/2008 | Borgendale et al. |
| 2008/0222717 | A1 | 9/2008 | Rothstein et al. |
| 2008/0307219 | A1 * | 12/2008 | Karandikar ............ H04L 63/166 713/153 |
| 2008/0320297 | A1 | 12/2008 | Sabo et al. |
| 2009/0220080 | A1 | 9/2009 | Herne et al. |
| 2009/0225675 | A1 | 9/2009 | Baum et al. |
| 2009/0245083 | A1 | 10/2009 | Hamzeh |
| 2009/0296593 | A1 | 12/2009 | Prescott |
| 2009/0327695 | A1 | 12/2009 | Molsberry et al. |
| 2010/0091770 | A1 | 4/2010 | Ishikawa |
| 2010/0095367 | A1 | 4/2010 | Narayanaswamy |
| 2010/0131755 | A1 | 5/2010 | Zhu et al. |
| 2010/0135498 | A1 | 6/2010 | Long et al. |
| 2010/0191856 | A1 | 7/2010 | Gupta et al. |
| 2010/0250928 | A1 | 9/2010 | Goto |
| 2010/0268937 | A1 | 10/2010 | Blom et al. |
| 2010/0316216 | A1 | 12/2010 | Fukushima et al. |
| 2010/0322248 | A1 | 12/2010 | Ivanov |
| 2011/0019574 | A1 | 1/2011 | Malomsoky et al. |
| 2011/0073490 | A1 | 3/2011 | Hayamizu et al. |
| 2011/0231935 | A1 * | 9/2011 | Gula .................... H04L 43/028 726/25 |
| 2011/0280149 | A1 | 11/2011 | Okada et al. |
| 2012/0016977 | A1 * | 1/2012 | Robertson ............... H04L 63/20 709/224 |
| 2012/0131330 | A1 | 5/2012 | Tonsing et al. |
| 2012/0176917 | A1 | 7/2012 | Matityahu et al. |
| 2012/0210385 | A1 | 8/2012 | Cirstea et al. |
| 2012/0215328 | A1 | 8/2012 | Schmelzer |
| 2012/0243533 | A1 | 9/2012 | Leong |
| 2012/0294305 | A1 | 11/2012 | Rose et al. |
| 2013/0010608 | A1 | 1/2013 | Ramachandran et al. |
| 2013/0042323 | A1 | 2/2013 | Narayanaswamy |
| 2013/0061036 | A1 | 3/2013 | Oliver |
| 2013/0064084 | A1 | 3/2013 | Babbar et al. |
| 2013/0103734 | A1 | 4/2013 | Boldyrev et al. |
| 2013/0166730 | A1 | 6/2013 | Wilkinson |
| 2013/0198512 | A1 | 8/2013 | Rubin et al. |
| 2013/0232104 | A1 | 9/2013 | Goyal et al. |
| 2013/0262655 | A1 | 10/2013 | Deschenes et al. |
| 2014/0040451 | A1 | 2/2014 | Agrawal et al. |
| 2014/0189093 | A1 | 7/2014 | Toit et al. |
| 2014/0195797 | A1 | 7/2014 | Toit et al. |
| 2014/0242972 | A1 | 8/2014 | Slotznick |
| 2014/0258511 | A1 | 9/2014 | Sima et al. |
| 2014/0269777 | A1 | 9/2014 | Rothstein et al. |
| 2014/0351415 | A1 | 11/2014 | Harrigan et al. |
| 2015/0006896 | A1 | 1/2015 | Franck |
| 2015/0100780 | A1 | 4/2015 | Rubin et al. |
| 2015/0188702 | A1 | 7/2015 | Men et al. |
| 2015/0269358 | A1 | 9/2015 | Hesketh et al. |
| 2015/0350167 | A1 | 12/2015 | Djakovic |
| 2016/0056959 | A1 | 2/2016 | Blom et al. |
| 2016/0119215 | A1 | 4/2016 | Deschenes et al. |
| 2016/0134659 | A1 | 5/2016 | Reddy et al. |
| 2017/0093796 | A1 | 3/2017 | Wang et al. |

OTHER PUBLICATIONS

Official Communication for U.S. Appl. No. 15/466,248 dated Jun. 5, 2017, 30 pages.
Official Communication for U.S. Appl. No. 15/466,248 dated Oct. 3, 2017, 34 pages.
OA Communication for U.S. Appl. No. 13/831,673 dated Sep. 30, 2013, 10 pages.
OA Communication for U.S. Appl. No. 13/831,673 dated Mar. 6, 2014, 12 pages.
OA Communication for U.S. Appl. No. 13/831,673 dated May 22, 2014, 5 pages.
OA Communication for U.S. Appl. No. 14/107,580 dated Mar. 6, 2014, 13 pages.
OA Communication for U.S. Appl. No. 13/831,908 dated Jun. 25, 2014, 15 pages.
OA Communication for U.S. Appl. No. 14/500,893 dated Nov. 20, 2014, 15 pages.

(56) References Cited

OTHER PUBLICATIONS

OA Communication for U.S. Appl. No. 13/831,908 dated Apr. 9, 2014, 3 pages.
OA Communication for U.S. Appl. No. 13/831,908 dated Aug. 9, 2013, 29 pages.
OA Communication for U.S. Appl. No. 13/831,908 dated Jan. 13, 2014, 31 pages.
OA Communication for U.S. Appl. No. 13/831,959 dated Aug. 22, 2013, 9 pages.
Handel et al. "Hiding Data in the OSI Network Model," Los Alamos, New Mexico, 1996, 16 pages.
OA Communication for U.S. Appl. No. 14/107,631 dated Feb. 20, 2014, 16 pages.
OA Communication for U.S. Appl. No. 14/107,631 dated Sep. 26, 2014, 14 pages.
OA Communication for U.S. Appl. No. 14/107,580 dated Sep. 15, 2014, 15 pages.
OA Communication for U.S. Appl. No. 14/500,893 dated Feb. 18, 2015, 11 pages.
OA Communication for U.S. Appl. No. 14/107,631 dated Dec. 30, 2014, 12 pages.
OA Communication for U.S. Appl. No. 13/831,626 dated Sep. 3, 2013, 17 pages.
Handley et al., "Network Intrusion Detection: Evasion, Traffic Normalization, and End-to-End Protocol Semantics," 2011, International Computer Science Institute, 17 pages.
Information Sciences Institute, "Internet Protocol Darpa Internet Program Protocol Specification," Sep. 1981, 36 pages.
Fuertes, "Evaluation of OSPF Extensions in MANET Routing," Paris, 2007, 192 pages.
Parsons, "Moving Across the Internet: Code-Bodies, Code-Corpses, and Network Architecture," May 9, 2010 20 pages.
Zander et al., "Covert Channels and Countermeasures in Computer Network Protocols," Dec. 2007, 7 pages.
Official Communication for U.S. Appl. No. 14/518,996 dated Apr. 20, 2015, 37 pages.
Official Communication for U.S. Appl. No. 14/500,393 dated Jun. 15, 2015, 12 pages.
Official Communication for U.S. Appl. No. 14/518,996 dated Jul. 21, 2015, 17 pages.
Official Communication for U.S. Appl. No. 14/518,996 dated Nov. 20, 2014, 41 pages.
Official Communication for U.S. Appl. No. 14/695,690 dated Feb. 24, 2016, 11 pages.
Official Communication for U.S. Appl. No. 14/695,690 dated Sep. 9, 2015, 41 pages.
Mozilla Developer Network, "NSS Key Log Format," https://developer.mozilla.org/en-US/docs/Mozilla/Projects/NSS/Key_Log_Format, Jan. 8, 2010, 1 page.
Official Communication for U.S. Appl. 15/150,354 dated Jul. 5, 2016, 18 pages.
Official Communication for U.S. Appl. No. 15/150,354 dated Feb. 8, 2017, 8 pages.
Official Communication and Search Report for European Patent Application No. 16166907.2 dated Mar. 8, 2018, pp. 1-4.
Shever, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Official Communication for U.S. Appl. No. 15/466,248 dated Mar. 8, 2018, pp. 1-37.
Official Communication for U.S. Appl. No. 15/466,248 dated Jan. 11, 2018, pp. 1-2.
Official Communication and Search Report for European Patent Application No. 17210995.1 dated Jul. 6, 2018, pp. 1-11.
International Search Report and Written Opinion for International Patent Application No. PCT/US2017/068585 dated Jul. 4, 2018, pp. 1-9.
Official Communication for U.S. Appl. No. 15/466,248 dated Jul. 11, 2018, pp. 1-34.
Official Communication for U.S. Appl. No. 15/466,248 dated Oct. 18, 2018, pp. 1-31.

\* cited by examiner

SECURE COMMUNICATION SECRET SHARING

CROSS-REFERENCE TO RELATED APPLICATION(S)

This Utility patent application is a Continuation of U.S. patent application Ser. No. 15/150,354 filed on May 9, 2016, which is a Continuation of U.S. patent application Ser. No. 14/695,690 filed on Apr. 24, 2015, now U.S. Pat. No. 9,338,147 issued on May 10, 2016, the benefits of which are claimed under 35 U.S.C. § 120, and the contents of which are further incorporated in entirety by reference.

TECHNICAL FIELD

The present invention relates generally to network monitoring, and more particularly, but not exclusively, to monitoring encrypted network traffic communicated over a network.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

Furthermore as information technology infrastructure becomes more complex and more dynamic it may be more difficult to determine and monitor which devices and applications may be operative on a network. Also, the complexity may make it difficult, especially in large networks, for determining dependencies among the network devices and applications that are operative on the networks. However, as more network traffic is being encrypted, it has become more difficult for network monitors to analyze the content of monitored packets in a way that is both useful for analysis and helpful for troubleshooting a particular issue or event in a timely manner. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE EMBODIMENTS

Figure 1:
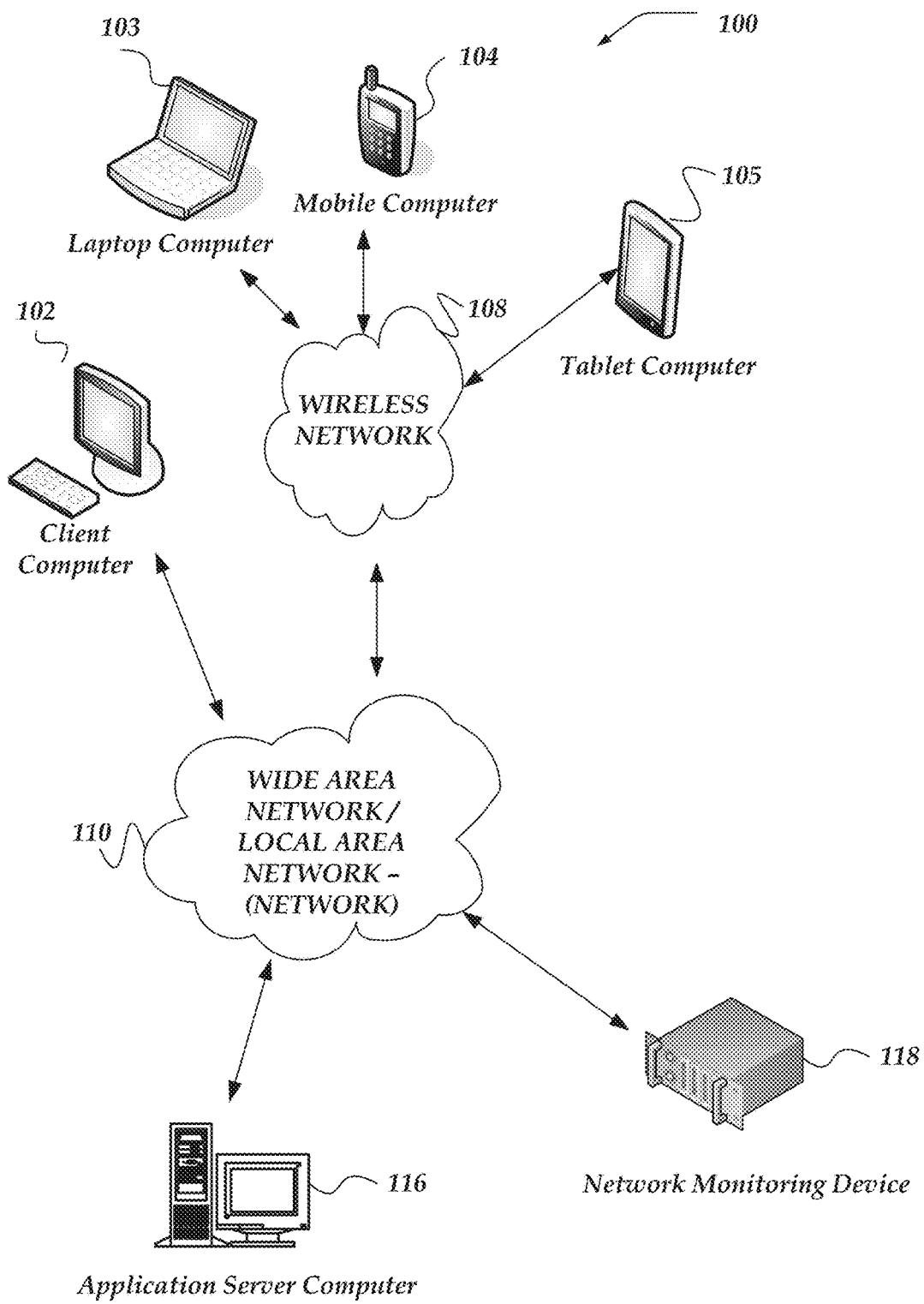
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the term "handshake" refers the data and messages exchanged between a client computer and server computer to establish secure communication channel. The particular secure communication protocol defines the handshake protocol that must be employed to establish a secure communication channel. In at least one of the various embodiments, the purpose of a handshake may be to enable the client and server to agree on one or more cryptographic features to employ, such as, authentication methods, key exchange methods, key sizes, cipher methods, or the like, or combination thereof.

As used herein, the terms "session flow" and "network flow" refer to one or more network packets or a stream of network packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port. In at least one of the various embodiments, a tuple may be employed to identify a flow. Also, other protocols may establish a separate flow for control information that enables management of at least one or more flows between two or more endpoints.

As used herein, the terms "secure communication connection," "secure communication channel," or "secure communication session" refer to cryptographically secure network communication sessions between client computers and server computers. For example, SSL/TLS sessions may be considered secure communication sessions. In at least one of the various embodiments, secure communication session will be comprised of network packets that have an encrypted data portion and some portion that is unencrypted. The encrypted portion of the network packets may often be considered the payload or data. The unencrypted portion of the network packets may include meta-data such as routing information, or the like, as determined by the protocol being employed. In some embodiments, participants in a secure communication session may employ cryptographic session keys to encrypt and/or decrypt data included in the network packets comprising a secure communication channel. The particular secure communication protocol being used will define how session keys are exchanged and/or generated.

As used herein, the terms "network monitor", "network monitor device", or "NMD" refer to an application (software, hardware, or some combination) that is arranged to monitor and record flows of packets in a session that are communicated between at least two endpoints over at least one network. The NMD can provide information for assessing different aspects of these monitored flows. In at least one embodiment, the NMD passively monitors network packet traffic without participating in the communication protocols. This monitoring is performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMD can receive network communication for monitoring through a variety of means including network taps, wireless receivers, port mirrors or directed tunnels from network switches, clients or servers including the endpoints themselves, or other infrastructure devices. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

The NMD may track network connections from and to end points such as a client and/or a server. The NMD may also extract information from the packets including protocol information at various layers of the communication protocol stack. The NMD may reassemble or reconstruct the stream of data exchanged between the endpoints. The NMD may perform decryption of the payload at various layers of the protocol stack. The NMD may passively monitor the network traffic or it may participate in the protocols as a proxy. The NMD may attempt to classify the network traffic according to communication protocols that are used.

The NMD may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMD may perform protocol classification using one or more techniques, such as, signature matching, statistical analysis, traffic analysis, and other heuristics. In some cases, the NMD may use adaptive protocol classification techniques where information used to classify the protocols may be accumulated and/or applied over time to further classify the observed protocols. The NMD may categorize the traffic where categories might include file transfers, streaming audio, streaming video, database access, interactive, gaming, and the like. The NMD may attempt to determine whether the traffic corresponds to known communications protocols, such as HTTP, FTP, SMTP, RTP, TDS, TCP, IP, and the like.

As used herein the term "hardware security module" refers to a hardware device or computer arranged for providing additional safeguards for storing and using security/cryptographic information such as, keys, digital certificates, passwords, passphrases, two-factor authentication information, personal identification numbers, or the like. In some embodiments, hardware security modules may be employed to support one or more standard public key infrastructures, and may be employed to generate, manage, and/or store keys pairs, or the like. In some embodiments, hardware security modules may be arranged and/or configured as stand-alone network computers, in other cases, they may be arranged as hardware cards that may be added to a computer. Further, in some cases, hardware security modules may be arranged as a portable computer, and/or incorporated into client computers.

As used herein the term "key provider" refers to a computer, hardware security module (HSM), program, service, or process that is arranged to provide, or otherwise communicate a session key to a NMD. In some embodiments, the NMD may request the session key from a key provider. In other embodiments, the key provider may push the session key to the NMD. In at least one of the various embodiments, a key provider may be considered to include a proxy, such as a network firewall, content caches, application delivery controller, as well as one or more intermediary services that may have received a session key from a client, server, or HSM.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring communication over a network using a network monitoring device (NMD) that may be enabled to share secrets that are used for secure communication. In at least one of the various embodiments, the NMD may passively monitor a plurality of network packets that may be communicated between one or more client computers and one or more server computers over the network. In at least one of the various embodiments, if a secure communication session may be determined to be established between a client computer and a server computer, a key provider may provide the NMD a session key that may correspond to the secure communication session. In at least one of the various embodiments, the key provider, may be the client computer, the server computer, or a hardware security module.

In at least one of the various embodiments, providing the session key to the NMD may include communicating a request from the NMD to the key provider to provide the session key. Alternatively, in at least one of the various embodiments, providing the session key to the NMD may include receiving a communication from the key provider that includes at least the session key.

In at least one of the various embodiments, the NMD may buffer each network packet associated with the secure communication session until the NMD is provided a session key that corresponds to the secure communication session.

In at least one of the various embodiments, the NMD may be arranged to determine correlation information from the one or more network packets that are associated with handshake messages used to establish the secure communication session. The correlation information may be used to by the NMD to determine the network connection flow that corresponds to the secure communication session based on a match of the correlation information with correlation information that is provided by the key provider with the session key. Further, in at least one of the various embodiments, the correlation information may include at least one of, an encrypted pre-master secret, Diffie-Hellman public information, a secure socket layer (SSL) session identifier or session ticket, one or more network information tuples, SSL/TLS random values from ClientHello or ServerHello messages, and one or more values derived from the one or more network packets.

Further, in at least one of the various embodiments, the NMD may use the session key to decrypt one or more network packets that may be communicated between the client computer and the server computer over the secure communication session. In at least one of the various embodiments, the NMD may then proceed to analyze the secure communication session based on the contents of the one or more decrypted network packets.

In at least one of the various embodiments, more than one NMD may be monitoring the network packets on a network. Accordingly, in at least one of the various embodiments, the NMDs may be arranged to communicate the session key and any correlation information to other NMDs enabling them to decrypt the network packets that may be associated with the secure communication session. Further, in at least one of the various embodiments, NMDs may be arranged to communicate with one or more other services, or computers, either local or remote, for obtaining session keys, correlation information, or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Application Server Computer 116, Network Monitoring Device 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, classification server computer 116, data sensor computer 118 and enterprise server computer 120, or other computers.

Client computers 102-105 may further be configured to include a client application that enables an end-user to log into an end-user account that may be managed by another computer, such as application server computer 116, network monitoring device 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring device 118. Also, client computers may be arranged to enable users to display reports, interactive user-interfaces, and/or results provided by network monitor device 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring device 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. Briefly, however, application server computer 116 includes virtually any network computer capable of hosting applications and/or providing services in network environment.

One embodiment of network monitoring device 118 is described in more detail below in conjunction with FIG. 3. Briefly, however, network monitoring device 116 includes virtually any network computer capable of passively monitoring communication traffic in a network environment.

Although FIG. 1 illustrates application server computer 116, and network monitor device 118, each as a single computer, the innovations and/or embodiments are not so limited. For example, one or more functions of application server computer 116, and/or network monitoring device 118, or the like, may be distributed across one or more distinct network computers. Moreover, in at least one embodiment, network monitoring device 118 may be implemented using a plurality of network computers. Further, in at least one of the various embodiments, application server computer 116, and/or network monitoring device 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
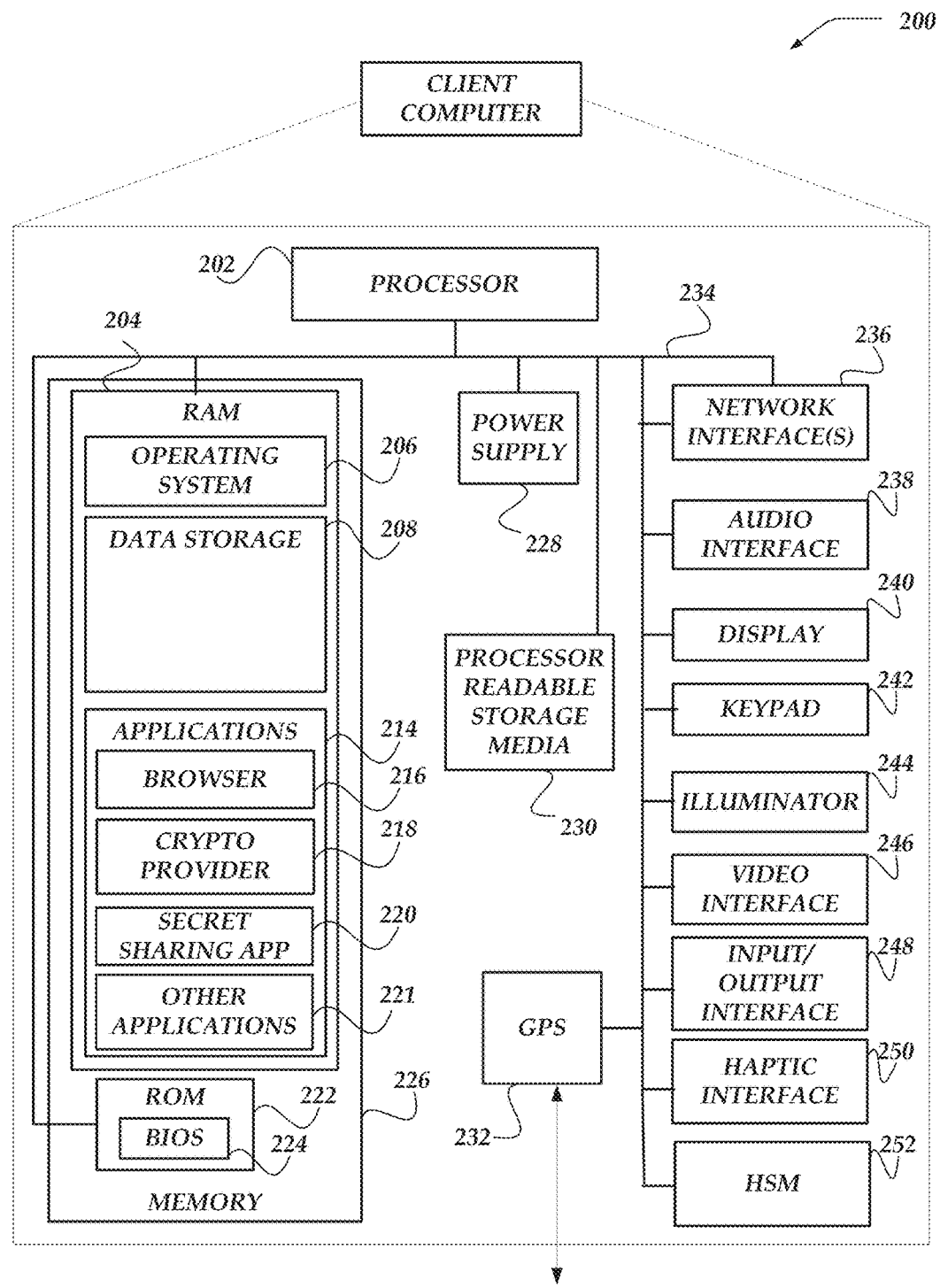
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor device, such as processor 202 in communication with a mass memory 226 via a bus 234. In some embodiments, processor 202 may include one or more central processing units (CPU) and/or one or more processing cores.

Client computer 200 also includes a power supply 228, one or more network interfaces 236, an audio interface 238, a display 240, a keypad 242, an illuminator 244, a video interface 246, an input/output interface 248, a haptic interface 250, a global positioning system (GPS) receiver 232, and a hardware security module (HSM).

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Further, client computer 200 may also comprise hardware security module (HSM) 252 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 252 may be a stand-alone computer, in other cases, HSM 252 may be arranged as a hardware card that may be added to a client computer.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or Linux™, or a specialized client communication operating system such as Microsoft Corporation's Windows Mobile™, Apple Inc.'s iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g., SMS, Multimedia Message Service (MMS), instant message (IM), email, and/or other messages), audio, video, and enable telecommunication with another user of another computer. Applications 214 may include, for example, a browser 216, one or more cryptographic providers, such as, crypto provider 218, secret sharing application 220, and other applications 221.

Browser 216 may include virtually any application configured to receive and display graphics, text, multimedia, messages, and the like, employing virtually any web based language. In one embodiment, the browser application is enabled to employ HDML, WML, WMLScript, JavaScript, SGML, HTML, HTML5, XML, and the like, to display and send a message. However, any of a variety of other web-based markup or programming languages may be employed. In one embodiment, browser 216 may enable a user of client computer 200 to communicate with another network computer, such as application server computer 116, and/or network monitoring device 118, or the like, as shown in FIG. 1.

Secret sharing application 220 may be a process or service that is arranged to communicate one or more cryptographic secrets to one or more NMDs, such as, NMD 116. Further, in at least one of the various embodiments, secret sharing application 220 may be arranged to be a plug-in of browser 216. Also, in at least one of the various embodiments, secret sharing application 220 may be embedded into cryptographic provider and/or a plug-in associated with cryptographic provider 218.

Other applications 222 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
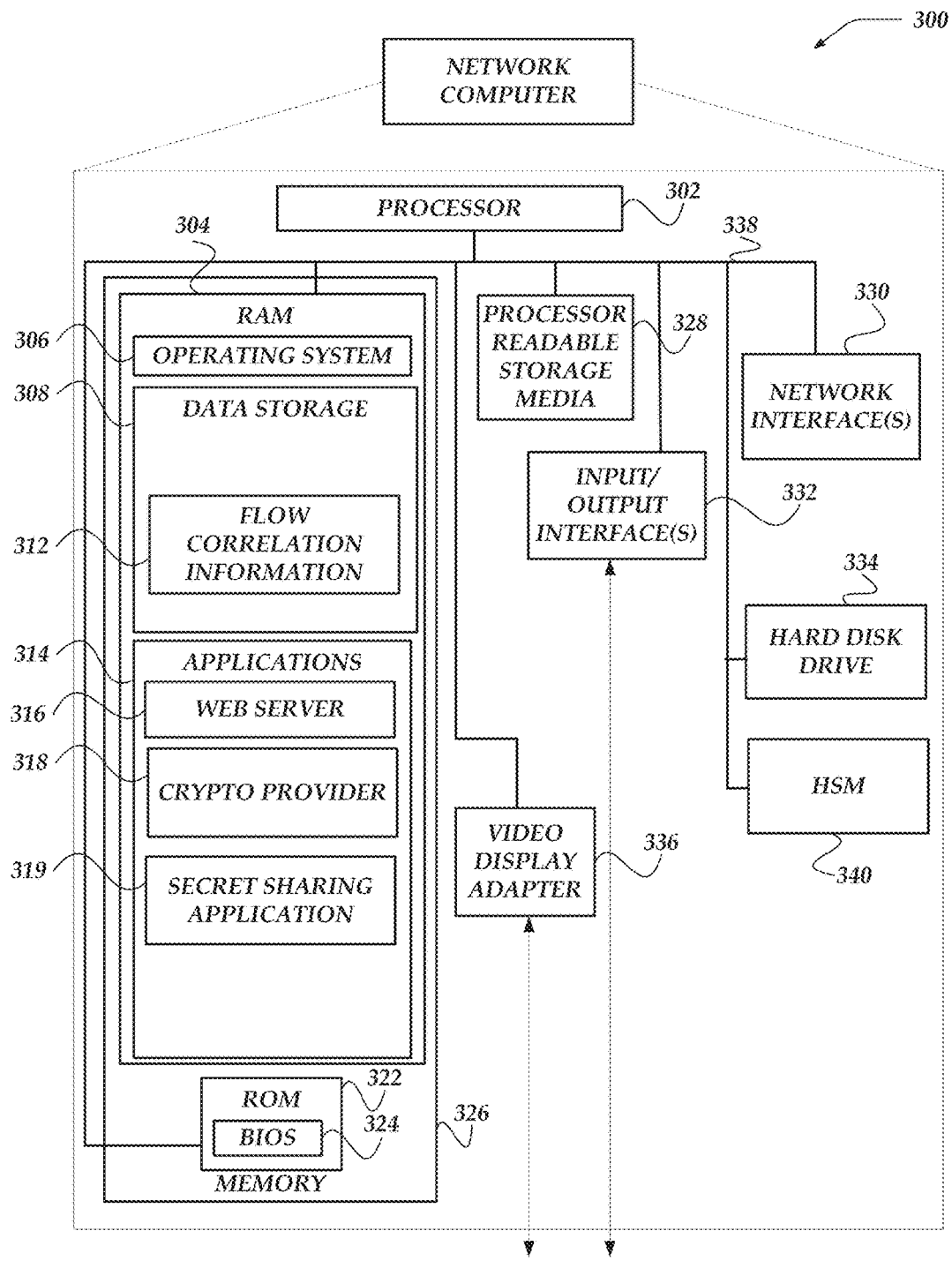
FIG. 3 illustrates a schematic embodiment of a network computer.

FIG. 3 shows one embodiment of a network computer 300, in accordance with at least one of the various embodiments. Network computer 300 may include many more or less components than those shown. The components shown, however, are sufficient to disclose an illustrative embodiment for practicing the invention. Network computer 300 may be configured to operate as a server, client, peer, a host, a cloud instance, a network monitoring device, a network hardware security module, or any other computer. Network computer 300 may represent, for example application server computer 116, network monitoring device 118, or the like.

Network computer 300 includes one or more processor devices, such as, processor 302. Also, network computer 300 includes processor readable storage media 328, network interface unit 330, an input/output interface 332, hard disk drive 334, video display adapter 336, hardware security module 340, and memory 326, all in communication with each other via bus 338.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, solid state storage devices, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor device, such as processor 302 to execute and perform actions. In one embodiment, at least some of data store 308 might also be stored on another component of network computer 300, including, but not limited to processor-readable storage media 328, hard disk drive 334, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user-interface programs, IPSec applications, encryption programs, security programs, SMS message servers, IM message servers, email servers, account managers, and so forth. Applications 314 may also include, web server 316, crypto provider application 318, secret sharing application 319, or the like.

Web server 316 may represent any of a variety of information and services that are configured to provide content, including messages, over a network to another computer. Thus, website server 316 can include, for example, a web server, a File Transfer Protocol (FTP) server, a database server, a content server, email server, or the like. Website server 316 may provide the content including messages over the network using any of a variety of formats including, but not limited to WAP, HDML, WML, SGML, HTMLS, XML, Compact HTML (C-HTML), Extensible HTML (XHTML), or the like.

Secret sharing application 319 may be a process or service that is arranged to communicate one or more cryptographic secrets to one or more NMDs, such as, NMD 118. Further, in at least one of the various embodiments, secret sharing application 319 may be arranged to be a plug-in of browser 316. Also, in at least one of the various embodiments, secret sharing application 318 may be embedded into cryptographic provider and/or a plug-in associated with cryptographic provider 318.

Further, network computer 300 may also comprise hardware security module (HSM) 340 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 340 may be a stand-alone network computer, in other cases, HSM 340 may be arranged as a hardware card that may be installed in a network computer.

In at least one of the various embodiments, some or all of crypto provider 318 may be arranged to execute on HSM 340. Also, HSM 340 may provide one or more cryptographic services to crypto provider 318.

Illustrative Logical System Architecture

Figure 4:
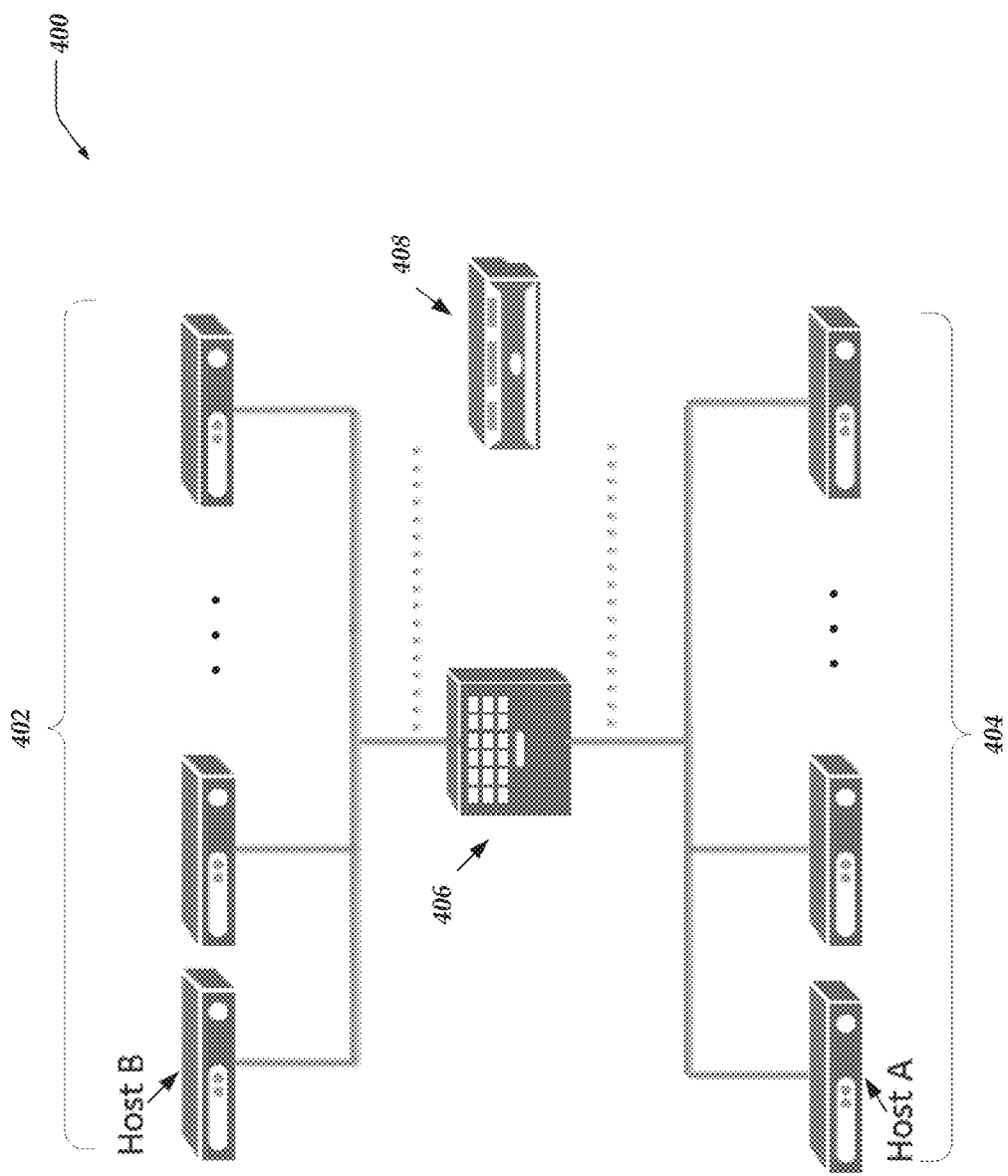
FIG. 4 illustrates a logical architecture of a system for secure communication secret sharing in accordance with at least one of the various embodiments.

FIG. 4 illustrates a logical architecture of system 400 for secure communication secret sharing in accordance with at least one of the various embodiments. System 400 may be arranged to include a plurality of network devices on first network 402 and a plurality of network devices on second network 404. Communication between the first network and the second network is managed by switch 406. Also, NMD 408 is arranged to passively monitor and/or record packets (network packets) that are communicated in network connection flows between a network devices on first network 402 and second network 404. For example, the communication of flows of packets between the Host B network device and the Host A network device are managed by switch 406 and NMD 408 may be passively monitoring and recording some or all of the network traffic comprising these flows.

NMD 408 may be arranged to receive network communication for monitoring through a variety of means including network taps, wireless receivers, port mirrors or directed tunnels from network switches, clients or servers including the endpoints themselves, or other infrastructure devices. In at least some of the various embodiments, the NMD may receive a copy of each packet on a particular network segment or virtual local area network (VLAN). Also, for at least some of the various embodiments, NMDs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

Figure 5:
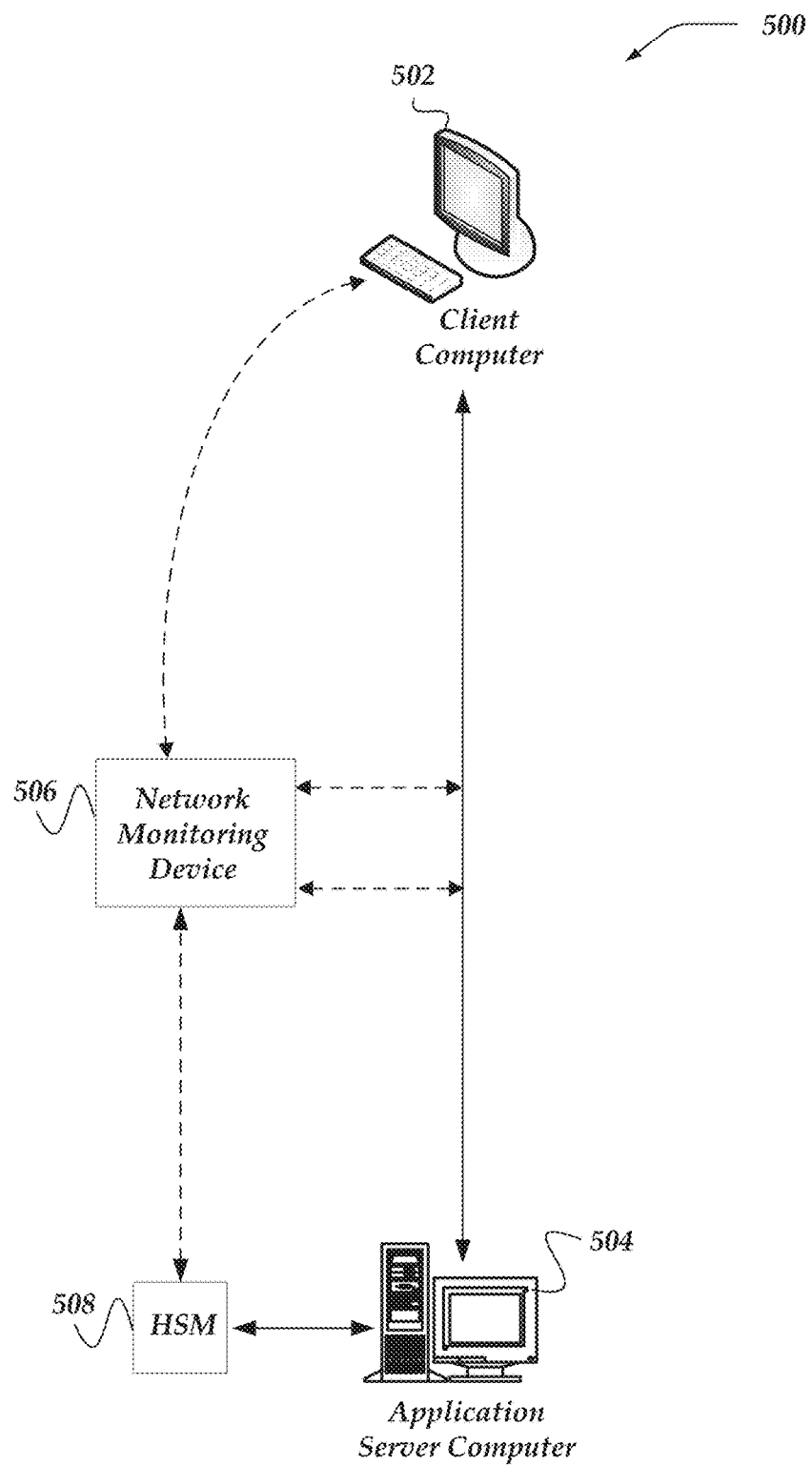
FIG. 5 illustrates a logical architecture of a system for secure communication secret sharing in accordance with at least one of the various embodiments.

FIG. 5 illustrates a logical architecture of system 500 for secure communication secret sharing in accordance with at least one of the various embodiments. In at least one of the various embodiments, system 500 comprises client computer 502, application server computer 504, network monitoring device 506, and optionally, hardware security module 508.

In at least one of the various embodiments, client computer 502 may be a computer that has one or more applications that may be arranged to securely communication with application server computer 504 over network. Secure communication may be comprised of one or more cryptographically secure network communication protocols, including, SSL/TLS, SFTP, SSH, or the like, or combination thereof. For example, in some embodiments, client computer 502 may be hosting a web browser that is securely accessing a website that is served by a web server running on application server computer 504. Another non-limiting example, may include client computer 502 accessing an application running on application server computer 504 over a virtual private network. As described above, NMD 506 may be arranged to passively monitor the network packets comprising communication between client computer 502 and application server computer 504.

In at least one of the various embodiments, application server computer 504 may employ a network hardware security module, such as, HSM 508 to provide one or more cryptographic services that may be employed to perform secure communication with client computer 502. For example, HSM 508 may generate and/or store cryptographic keys used (including session keys) for establishing secure communication with client computer 502.

In at least one of the various embodiments, client applications and server applications running on client computers, such as, client computer 502 and/or server computers, such as, server computer 504 may be arranged to employ one or more cryptographic protocols to provide secure communication between them. Various secure communication protocols, such as SSL/TLS may define handshake protocols, authentication protocols, key exchange protocols, or the like, or combination thereof, that implement the secure communication between the clients and servers. Accordingly, in at least one of the various embodiments, the cryptographic protocols may include using one or more session keys to encrypt and/or decrypt the communication traffic. Thus, in at least one of the various embodiments, if a secure communication session is established between a server and a client, an NMD, such as, NMD 506 may require a session key to decrypt the encrypted network packets that may be communicated over the secure communication channel. For example, if a client application running on client computer 502 establishes a secure communication session with a server application running on server computer 504, NMD 506 may require a session key to decrypt the secure network traffic to perform monitoring and analysis based on the contents of the packets in comprising the secure network traffic.

In some cases, NMD 506 may be able to derive and/or generate a session key by passively monitoring the handshake information that may be exchanged between the client and server computer. However, for other cases, the client and server may employ a handshake protocol that cryptographically prevents NMD 506 from being able to obtain or generate a session key using information gathered by passive monitoring. For example, if the client and server employ an ephemeral Diffie-Hellman key exchange or agreement, it may be infeasible for NMD 506 to observe and/or capture the information that may be required to generate the session key using just passive monitoring. Also, in at least one of the various embodiments, other well-known and/or custom forward secrecy or perfect forward secrecy (PFS) variants for key exchange or agreement may also prevent NMD 506 from obtaining or deriving a session key just by using passive monitoring.

In some embodiments, where NMD 506 is unable to obtain or derive a session key using passive monitoring, one or more of client computer 502, server computer 504, or hardware security module 508, may be arranged to provide and/or communicate session key information for a given secure communication session to NMD 506. In such cases, if a secure communication session may be established, a key provider may provide the appropriate session key information to an NMD, such as NMD 506.

In at least one of the various embodiments, NMD 506 may be arranged to request the session key once it has observed and determined that the cryptographic handshake between the client and server is in progress or has finished. In at least one of the various embodiments, key providers may be arranged to communicate (e.g., push) session key information to an NMD after the secure communication session has been established.

In at least one of the various embodiments, there may be a time gap between when a client and server established as secure communication session and when the NMD is provided a session key. Accordingly, in at least one of the various embodiments, NMDs may be arranged to buffer the secure communication traffic until a session key for the secure communication channel is provided. If a session key is provided to the NMD, the NMD may first decrypt the buffered encrypted data and then decrypt the secure communication on the fly as it is received by the NMD.

In at least one of the various embodiments, if the secure communication traffic may be decrypted by a NMD, such as, NMD 506, it may perform one or more monitoring and/or analysis actions based on the decrypted contents of the secure communication.

As used herein the terms client, or client computer, refer to programs and/or computers that may initiate a request for services from a server computer. Likewise, the terms server, or server computer, refer to programs and/or computers that may respond to a request for services from a client computer. For clarity, clients and servers are described separately, but one of ordinary skill in the art will appreciate that a given computer or program may sometimes operate as a server and other times operate as a client depending on whether it is requesting services or responding to requests for services.

Figure 6:
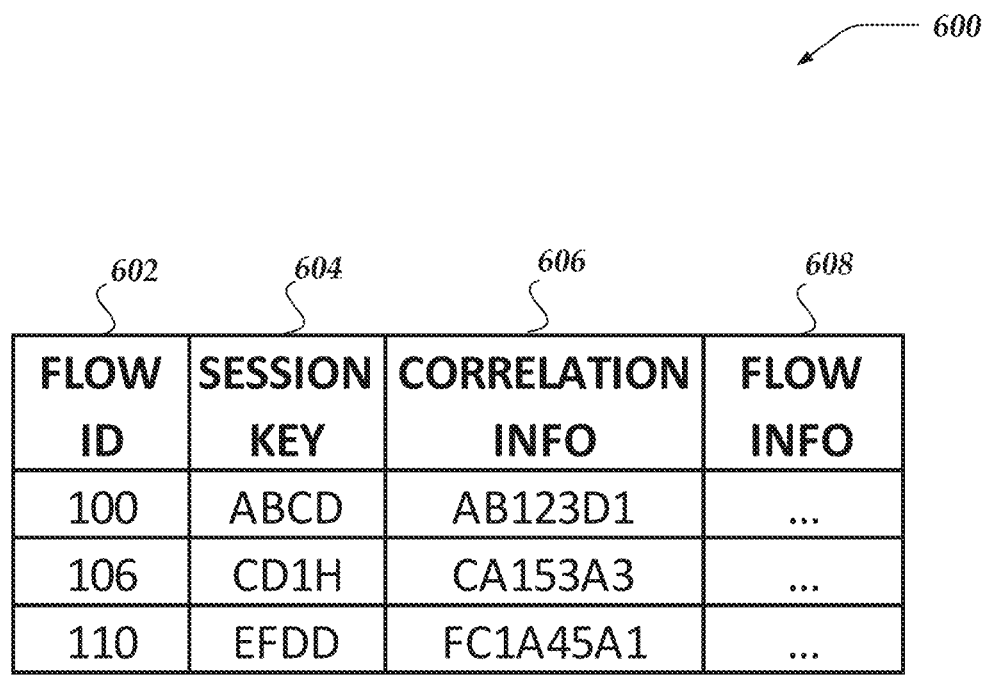
FIG. 6 illustrates a logical representation of a table that a network monitoring device may employ to associate session keys for secure communication with particular secure communication session and/or network connection flow.

FIG. 6 illustrates a logical representation of table 600 that a NMD may employ to associate session keys for secure communication with particular secure communication session and/or network connection flow. In at least one of the various embodiments, table 600 may be implemented using one or more data structures, such as, lists, arrays, associative arrays, or the like, or combination thereof. Furthermore, one of ordinary skill in the art will appreciate that other data structures or table arrangements are within the scope of the innovation described herein. However, the description of table 600 is at least sufficient to enable one or ordinary skill in the art to practice the innovations described herein.

In at least one of the various embodiments, some or all of the information represented by table 600 may be stored as flow correlation information 312 in network computer 300.

In at least one of the various embodiments, table 600 may be stored in memory of a NMD. In at least one of the various embodiments, column 602 of table 600 may contain a value that corresponds to a particular network connection, network flow, communication channel, or the like. The NMD may be arranged to index or otherwise identify each network flow that it is monitoring. In at least one of the various embodiments, column 604 may include a cryptographic session key that is associated with a network flow. The session key may correspond to a secure communication session that is occurring on/over the network flow. In at least one of the various embodiments, column 606 may include one or more types of correlation information that may be associated with a network flow. The correlation information values may be used in part to determine which network flow a provided session key corresponds to. As described in more detail below, a key provider may provide correlation information with a session key. Accordingly, the NMD may compare the correlation information provided with the session key to the correlation information captured and/or generated by the NMD. If a match of the correlation information is found, the session key may be associated with the corresponding network flow. And, column 608 may contain one or more fields of additional data that may be associated with a network flow. Column 608 represents additional information and/or metrics that may be captured and/or associated with a given network flow.

Generalized Operations

Figure 7:
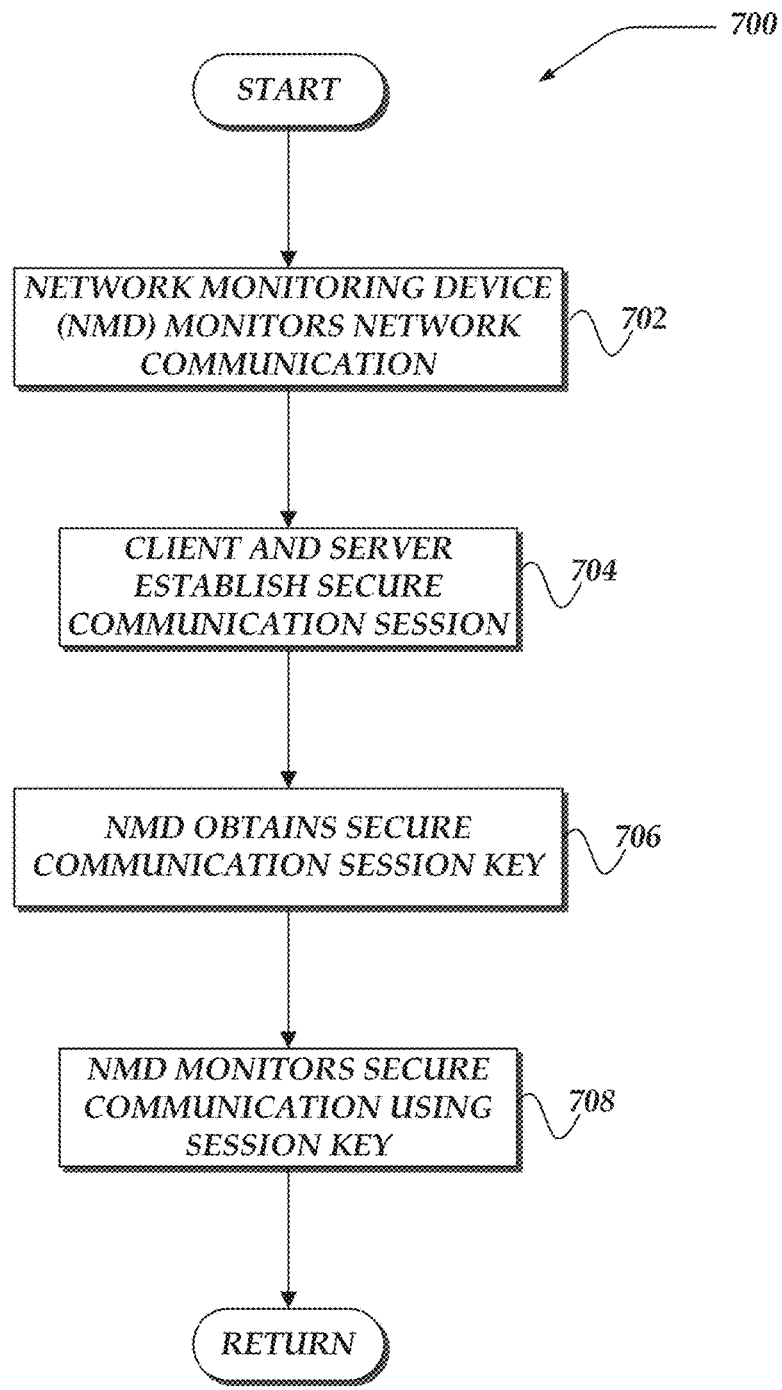
FIG. 7 illustrates an overview flowchart of a process that may be arranged to share secrets for secure communication in accordance with at least one of the various embodiments.
Figure 8:
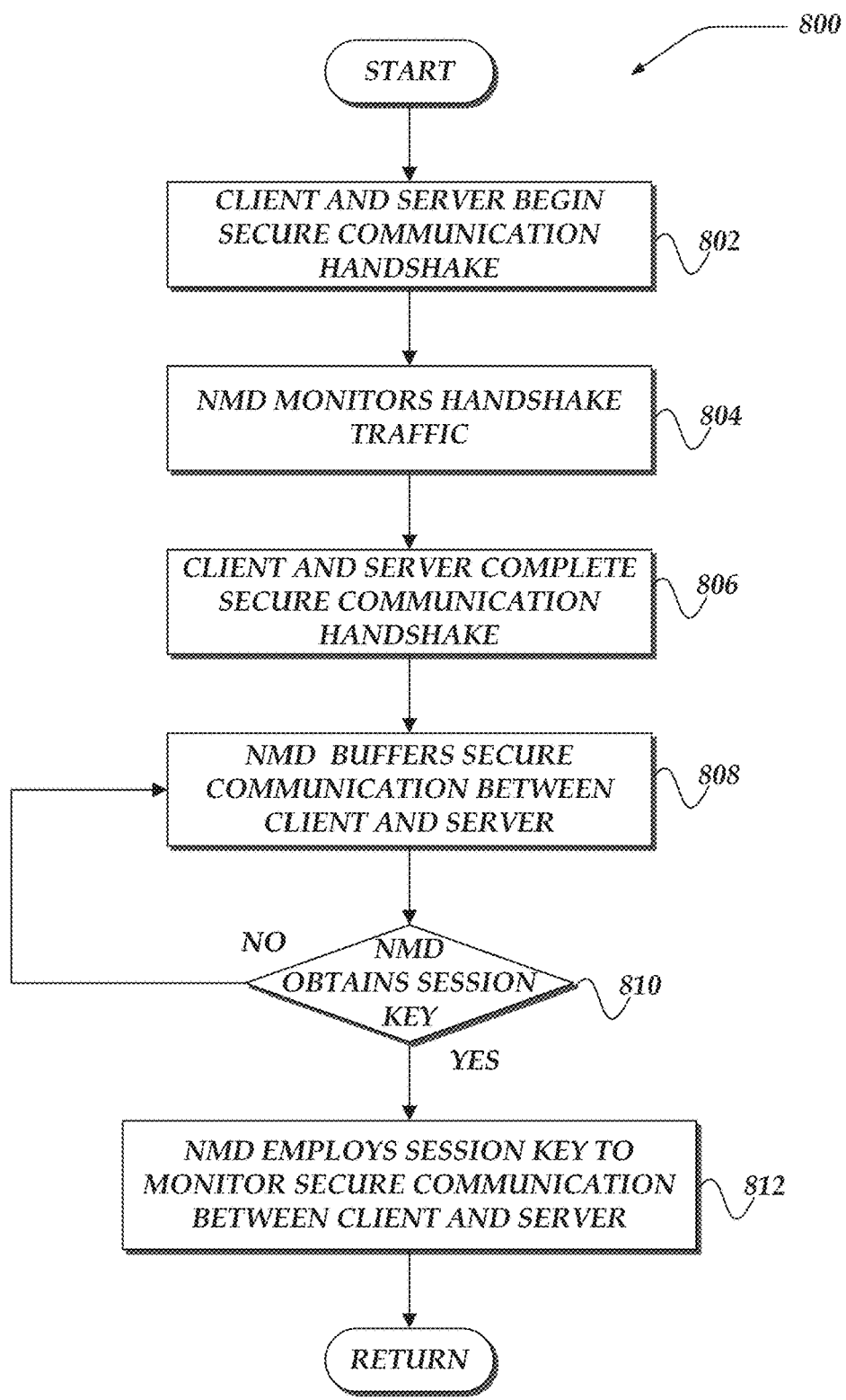
FIG. 8 illustrates a flowchart of a process that may be arranged to share secrets for secure communication in accordance with at least one of the various embodiments.
Figure 9:
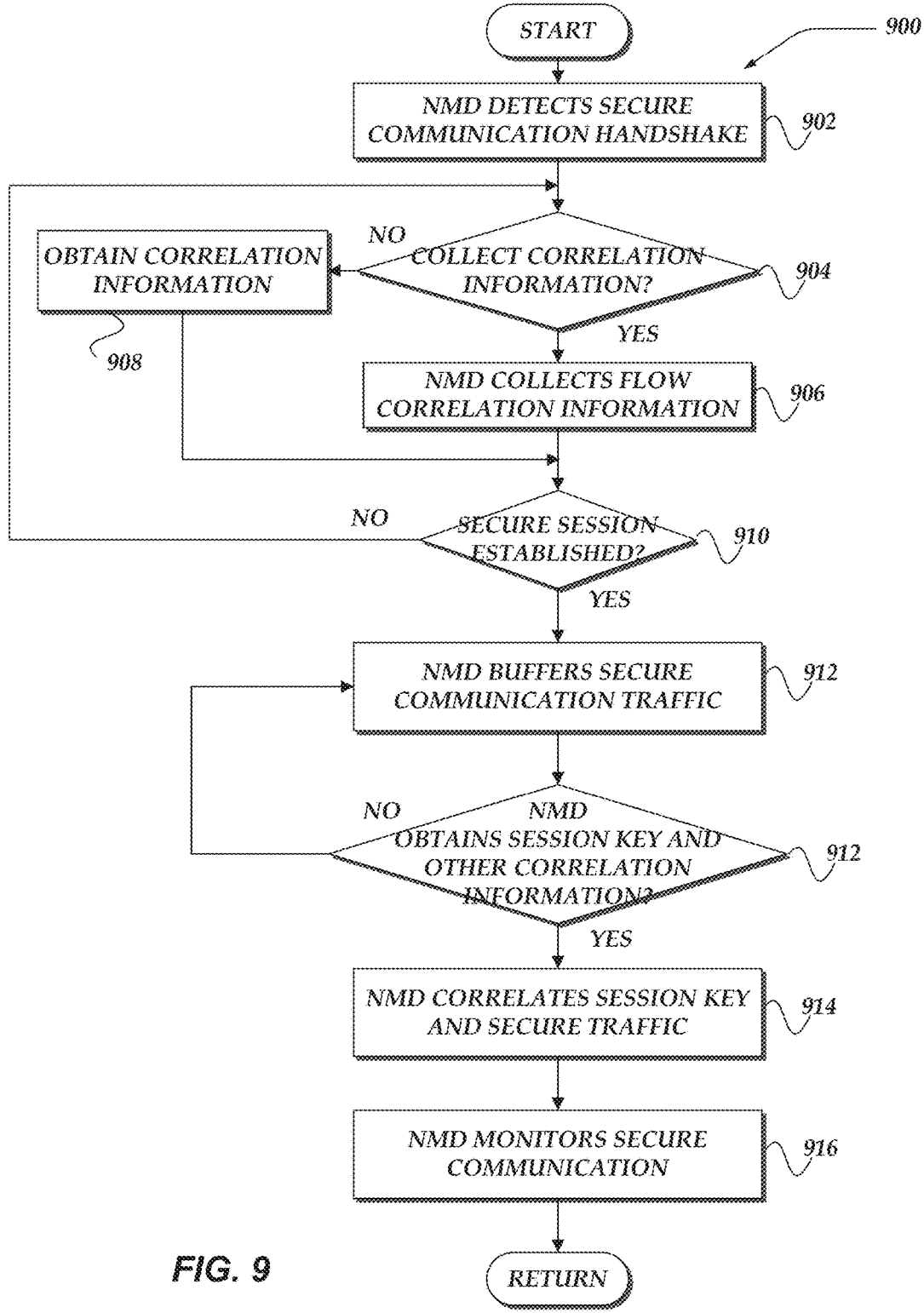
FIG. 9 illustrates a flowchart of a process for correlating session keys with secure communication flows in accordance with at least one of the various embodiments.

FIGS. 7-9 represent the generalized operation for secure communication secret sharing in accordance with at least one of the various embodiments. In at least one of the various embodiments, processes 700, 800, and 900 described in conjunction with FIGS. 7-9 may be implemented by and/or executed on a single network computer (or network monitoring device), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 7-9 may be used for secure communication sharing in accordance with at least one of the various embodiments and/or architectures such as those described in conjunction with FIGS. 4-6. Further, in at least one of the various embodiments, some or all of the action performed by processes 700, 800, and 900 may be executed in part by crypto provider 318, secret sharing application 319, and HSM 340, as well as, crypto provider 218, secret sharing application 220, and HSM 252.

FIG. 7 illustrates an overview flowchart of process 700 that may be arranged to share secrets for secure communication in accordance with at least one of the various embodiments. After a start block, at block 702, in at least one of the various embodiments, a network monitoring device (NMD) monitors communication on a network. As described above, one or more NMDs may be arranged to passively monitor network packets that may be communicated over a network.

In at least one of the various embodiments, more than one NMD may be monitoring the same network. Likewise, a network may be divided into one or more sub-network each having one or more NMDs monitoring their network traffic.

At block 704, in at least one of the various embodiments, a client computer and server computer may establish a secure communication session on a network that is being monitored by the NMD. In at least one of the various embodiments, commonly a client application running on the client computer and a server application running on a server computer may be arranged to use one or more secure communication protocols, such as SSL/TLS, to cryptographically secure their communication traffic.

In at least one of the various embodiments, the NMD may be prevented from monitoring of the contents/data of the network packets comprising a secure communication. Since, the NMD may not be an endpoint, or an active participant in communication, or otherwise, disposed between the client and server, it may not have access to some or all of the information necessary to decrypt the secure communication traffic. Accordingly, the NMD may not be able to monitor and/or analyze the contents of the secure communication. Note, for some secure communication protocols the NMD may be able to observer/monitor enough information to enable it decrypt the secure communication for monitoring. However, in some cases, such as, secure communication protocols that use one or more variants of ephemeral Diffie-Hellman key exchange or agreement, the NMD may be unable to passively observe sufficient information to enable it to decrypt the secure communication traffic.

At block 706, in at least one of the various embodiments, the NMD may obtain the session key information for the secure communication session. In at least one of the various embodiments, the NMD may be provided session key information from the client, the server, a proxy (e.g., firewall, cache, or application delivery controller, or the like), indirectly by way of a session key broker, a hardware security module (HSM), or the like, that enable it decrypt the secure communication between the client and server. In at least one of the various embodiments, the NMD may be arranged to request the session key information from the client, the server, a proxy, a session key broker, or the HSM. In such cases, the provider of the session key, the key provider, may be arranged to include one or more facilities that may determine a session key and provide it to a NMD upon request.

In at least one of the various embodiments, the provider of the session key may be arranged to push the session key information to the NMD. Accordingly, if a secure communication channel between a monitored client and server is established, one of the client, the server, a proxy, a session key broker, or the HSM may provide an appropriate session key to the NMD.

In at least one of the various embodiments, the session key information may be provided to the NMD over a separate secure communication channel that may be established between the key provider and the NMD. In at least one of the various embodiments, the session key may be provided over a separate network. In some embodiments, the session key information may be provided using the same network that is being monitored.

At block 708, in at least one of the various embodiments, the NMD may monitor the secure communication session using the session key information. The NMD may passively obtain network traffic associated with the secure communication. Accordingly, the NMD may employ the session key information to decrypt the network packets comprising the secure communication information. If the secure communication may be decrypted, the NMD may monitor and analyze the contents of the communication as necessary. Next, control may be returned to a calling process.

FIG. 8 illustrates a flowchart of process 800 that may be arranged to share secrets for secure communication in accordance with at least one of the various embodiments. After a start block, at block 802, in at least one of the various embodiments, a client and server begin a secure communication handshake. In at least one of the various embodiments, in some cases, clients and servers may be arranged to perform non-secure communication (e.g., unencrypted). Likewise, in other cases, they may be arranged to perform secure communications between each other. Generally, whether the communication is secure or non-secure may be determined by configuration information associated with the applications that are communicating. For example, a web server may be arranged to use secure communication (e.g., SSL/TLS) for certain URLs and non-secure communication for other URLs.

Accordingly, the client and server may initiate a handshake process for establishing a secure communication session based on their configuration. In at least one of the various embodiments, the purpose of the handshake may be to enable the client and server to agree on one or more cryptographic features to employ, such as, authentication methods, key exchange methods, key sizes, cipher methods, or the like, or combination thereof.

In at least one of the various embodiments, if the client and server can determine/negotiate a set of common features to employ for secure communication, those features may be used to establish a secure communication channel. The contents of handshake messages and their sequence may vary depending on the communication protocols being employed by the client and server. In at least one of the various embodiments, the secure communication protocol that is used may be determined by the applications running on the client computer and the server computer.

At block 804, in at least one of the various embodiments, a network monitoring device (NMD) arranged to the monitor the network being used by the client and server may begin monitoring the network traffic associated with the client and server. In at least one of the various embodiments, secure communication protocols may define handshake protocols that are observable on the network by the NMD. For example, one or more records in the network traffic exchanged during handshaking may be unencrypted, enabling the NMD to determine that handshaking may be occurring between the client and server. In some embodiments, the NMD may determine that handshaking is occurring even though it is unable to obtain cryptographic information, such as, exchanged keys, secrets, or the like, from the handshake messages.

At block 806, in at least one of the various embodiments, at some point, the client and server may complete the handshake procedure and begin communicating encrypted network packets over the secure communication. In at least one of the various embodiments, the NMD monitoring the network may be arranged to observe that the handshake is finished based one or more observable changes in the communication between the client and server. For example, the secure communication protocol TLS records include a Content Type field that may be used to distinguish between handshake records and data traffic records (application records) and other records (e.g., alerts). Other secure communication protocols may employ different yet similar methods that may indicate if a handshake has completed.

Further, in at least one of the various embodiments, the NMD may identify additional features of the network traffic that may indicate if a handshake is in process. For example, the NMD may monitor the timing of messages exchanged between the client and server to determine if a handshake is occurring.

At block 808, in at least one of the various embodiments, the NMD may begin buffering the secure communication traffic between the client and server. In at least one of the various embodiments, the NMD may be arranged to continuously buffer network packets associated with monitored sessions using a ring-buffer or similar buffering architecture. The NMD may buffer a portion of the secure communication traffic until such time that it may be enable to decrypt it. The amount of traffic that may be buffered may depend on the amount of available buffer memory and one or more configuration values that may allocate buffer sizes within the NMD.

In at least one of the various embodiments, rather than using buffering, the NMD may be arranged to record a value that represents the amount of the encrypted payload traffic that is exchanged before the session key is obtained. This value may enable the NMD to begin decrypting and analyzing when the next block of encrypted traffic is received.

At decision block 810, in at least one of the various embodiments, if the NMD obtains the session key corresponding to the secure communication session between the client and the server, control may flow to block 812; otherwise, control may loop back to block 808.

In at least one of the various embodiments, the session key generated during the handshake portion of the communication between the client and the server may be provided to the NMD to enable it to decrypt the secure communication for monitoring. In at least one of the various embodiments, the session key may be provided by a key provider, such as, the client, the server, a proxy, a session key broker, or a hardware security module.

In at least one of the various embodiments, an application or service running on the client computer may provide the session key to the NMD over a network. For example, a client such as a web browser running on the client computer may be arranged to provide a session key used for secure communication with a web server (e.g., a website secured using SSL/TLS) to the NMD. In other embodiments, the networking/cryptographic facilities of the client computer may be arranged to provide the session key to the NMD. In some embodiments, the session key may be provided by a library, plug-in, extension, or the like, or combination thereof, used by a client application, a client service, a client process, or the like, running on the client computer.

Similarly, in at least one of the various embodiments, an application or service running on the server computer may provide the session key to the NMD over a network. For example, a server such as a web server running on the server computer may be arranged to provide a session key used for secure communication between a web server and a web browser running on a client computer. In other embodiments, the networking/cryptographic facilities of the server computer may be arranged to provide the session key to the NMD. In some embodiments, the session key may be provided by a library, plug-in, extension, or the like, or combination thereof, used by a server application, a server service, a server process, or the like, running on the server computer.

In at least one of the various embodiments, a hardware security module and/or a network hardware module may be arranged to provide the session key to the NMD for use in decrypting the secure communication traffic. In at least one of the various embodiments, the HSM may be arranged to communicate the session key to the NMD over a network.

In at least one of the various embodiments, the NMD may be arranged to obtain a session key from other sources, such as a network firewall, local or remote content cache, application delivery controller, or the like, or combination thereof. Also, in at least one of the various embodiments, the session key may be provided to the NMD by a session key broker that obtained the session key from the client, server, or HSM.

At block 812, in at least one of the various embodiments, the NMD may employ the session key to monitor secure communication between client and server. In at least one of the various embodiments, the NMD may passively capture encrypted network packets that may comprise the secure communication. The session key provided by the server, client, proxy, session key broker, or HSM, may be used to decrypt the network packets to enable the NMD to perform one or more monitoring and/or analysis functions based on the content of the decrypted network packets. Next, control may be returned to calling process.

FIG. 9 illustrates a flowchart of process 900 for correlating session keys with secure communication flows in accordance with at least one of the various embodiments. After a start block, at block 902, in at least one of the various embodiments, an NMD detects the occurrence of a secure communication handshake. As discussed, above, an NMD may be arranged to determine if a client and server begin a handshake process to establish a secure communication session by monitoring the network traffic of the clients and servers that are on the monitored network.

At decision block 904, in at least one of the various embodiments, if the NMD is arranged and/or configured to collect correlation information, control may flow to block 906; otherwise, control may flow to block 908.

At block 906, in at least one of the various embodiments, the NMD may collect one or more portions of correlation information. In at least one of the various embodiments, particular correlation information captured by the NMD may depend on the secure communication protocol that is being used by the client and server. The captured correlation information may be compared to correlation information that the key provider provides with in addition to the session key. Thus, the correlation information may enable the NMD to associate a provided session key with the particular network flow/secure communication session that the session key may be used for decrypting.

In at least one of the various embodiments, a network tuple value that includes that source network address, destination network address, source port value, destination port value, VLAN identifier, or the like, or combination thereof, may be captured/determined for each secure communication channel. Accordingly, if a NMD determines that a network flow is performing a handshake to establish a secure communication channel it may store the network tuple value and associate with the flow that is doing a handshake. (See, FIG. 6). Then, if a key provider provides the session key and correlation information that includes the network tuple information, the NMD may determine the secure communication session that corresponds to the session key.

In some embodiments, the cryptographic facility (the key provider) used to communicate the session keys to a NMD may be isolated from the network information of the secure communication session. In these embodiments, a network tuple value corresponding to the secure communication channel may be unknown or otherwise unavailable to the key provider. Accordingly, the correlation information must be something other than a tuple derived from the network connection information. For example, in at least one of the various embodiments, a HSM, such as, network HSM 508 may not have visibility of the network information (e.g., source address, destination address, and so on) associated with the secure communication session. It may just have access to the cryptographic information for a secure communication, absent the network information. For example, it may just have access to the session keys and no awareness of the network information required to generate a network tuple to provide correlation information for the NMD.

In at least one of the various embodiments, the NMD may use other features inherent in the secure communication protocol for correlation information. For example, a digest may be generated from one or more of the visible fields in the network packets using a hashing function. Then the digest value may be used to index and identify the secure communication flow at the NMD. (See, FIG. 6, column 606.) In at least one of the various embodiments, fields, values, or data structures from one or more network packets, segments, messages or records derived from the network communication between the client and server may be employed to generate correlation information. In at least one of the various embodiments, the particular information used for generating and/or deriving correlation information may be described/defined using configuration information including one or more rule-based policies, or the like. In some embodiments, the NMD may be configured by an operator to determine/identify the fields, values, or data structures that may be used for correlation information. Likewise, type of configuration information may be provided in a configuration file, configuration database, or the like, or combination thereof.

In at least one of the various embodiments, the NMD may be configured to collect/generate correlation information that one or more session key providers may also be able to collect and/or generate. In at least one of the various embodiments, the NMD may be configured to collect and/or generate more than one type of correlation information for each secure communication session. Accordingly, by having multiple sets of correlation information per secure communication flow the NMD may be able to use correlation information compatible with a variety of different session key providers.

Accordingly, for a given secure communication session, the NMD may collect/generate network tuple information, TCP sequence numbers, a SSL/TLS Session ID (if any), SSL/TLS Session Ticket (if any), Diffie-Hellman public information (from Diffie-Hellman key exchanges), SSL/TLS random values from ClientHello and/or ServerHello, SSL/TLS ClientKeyExchange and/or ServerKeyExchange (if any), generate a digest of other visible record values, or collect/generate one or more values derived from the network packets of the handshake or the secure communication. Thus, if a key provider sends any one of these types of correlation information with the session key, the NMD may be able to correlate the session key to the its corresponding secure communication session.

For example, in at least one of the various embodiments, for the SSL/TLS protocol, ClientHello.random may be a field or value and also a structure (it has a gmt_unix_time field, and an random_bytes field) from the ClientHello handshake message, the ClientHello handshake message is part of SSL/TLS's Handshake Protocol (or sub-protocol). One or more handshake messages may be contained within one or more SSL/TLS records. These SSL/TLS records may be transmitted over a network using TCP/IP. These records may be contained within one TCP/IP packet or they may span multiple TCP/IP packets. Thus, a NMD may be arranged to employ some or all of the ClientHello.random information as correlation information since particular ClientHello messages/records may correspond to a network flow and/or a secure communication session.

At block 908, in at least one of the various embodiments, the NMD may obtain the correlation information from a key provider or other source on the network. The correlation information may be as described for block 906.

At decision block 910, in at least one of the various embodiments, if a secure session is established, control may flow to block 912; otherwise, control may loop back to decision block 904 to continue the handshake process between the client and server. As discussed above, the NMD may monitor the network packets comprising handshake traffic to determine if the session has finished the handshake process and moved onto a secure communication session. At block 912, in at least one of the various embodiments, since secure communication has been established between the client and the server, the NMD may begin buffering the secure communication, as discussed above.

At decision block 912, in at least one of the various embodiments, if the NMD obtains a session key and other correlation information for the secure communication, control may flow to block 914; otherwise, control may loop to back block 912. In at least one of the various embodiments, the key provider that is arranged to provide the session key to the NMD may provide the session key and the other correlation information to the NMD.

At block 914, in at least one of the various embodiments, the NMD may correlate the session key to a secure communication session that it is monitoring. In at least one of the various embodiments, the NMD may employ the correlation information to determine which of the monitored network connection flows corresponds to the provided session key. In at least one of the various embodiments, the NMD may have collected multiple types of correlation information, if so it may test and/or compare each type of correlation information to determine if there is a match. If a match is found the NMD may associated the session key with the determined corresponding secure communication session.

At block 916, in at least one of the various embodiments, the NMD may employ the provided session key to decrypt (as necessary) the secure communication session. In at least one of the various embodiments, the NMD may employ its own cryptographic facilities to independently decrypt the network packets that are associated with the secure communication session. Accordingly, in at least one of the various embodiments, the NMD is not responsible for encrypting or decrypting the communication traffic for the client and server that are participating in the secure communication session. Rather, the client and server encrypt and decrypt the communication traffic using their own copies of the session key and their own cryptographic facilities. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The above specification, examples, and data provide a complete description of the composition, manufacture, and use of the invention. Since many embodiments of the invention can be made without departing from the spirit and scope of the invention, the invention resides in the claims hereinafter appended.

What is claimed as new and desired to be protected by Letters Patent of the United States is:

1. A method for monitoring communication over a network with a network monitoring device (NMD) that performs actions, comprising:
    passively monitoring a secure communication session based on correlation information for one or more network packets;
    providing a session key and other correlation information that corresponds to the secure communication session;
    identifying a network connection flow that corresponds to the secure communication session based on a comparison of the secure communication session's other correlation information with other correlation information provided by one or more key providers, wherein contents of one or more encrypted packets in the secure communication session are decrypted; and
    providing a display to a user of the decrypted contents of the one or more decrypted packets in the secure communication session.

2. The method of claim 1, further comprising employing the one or more key providers to provide the session key, wherein the one or more key providers include one or more of a client application, a server application, a session key broker, a hardware security module, a firewall, a proxy, a cache, or application delivery controller.

3. The method of claim 1, further comprising an application that is instantiated to perform the actions of the method, wherein the application is arranged as one or more of an application, a plugin for another application, or the application is integrated with one or more other applications.

4. The method of claim 1, further comprising providing two or more different sets of the secure communication's other correlation information, wherein each of these sets include different types of other correlation information that are compatible with two or more different key providers.

5. The method of claim 1, further comprising buffering the one or more packets for the secure communication session until the session key is provided.

6. The method of claim 1, further comprising employing the session key to decrypt a portion or more of the one or more network packets.

7. The method of claim 1, further comprising employing the NMD to communicate one or more of the session key or the secure communication session's other correlation information to one or more other NMDs, wherein the one or more other NMD's employ the one or more of the communicated session key and other correlation information to decrypt the one or more network packets.

8. A network device for monitoring communication over a network, comprising:
    a memory that stores instructions; and
    one or more processors that execute the instructions to perform actions, including:
        passively monitoring a secure communication session based on correlation information for one or more network packets;
        providing a session key and other correlation information that corresponds to the secure communication session;
        identifying a network connection flow that corresponds to the secure communication session based on a comparison of the secure communication session's other correlation information with other correlation information provided by one or more key providers, wherein contents of one or more encrypted packets in the secure communication session are decrypted; and providing a display to a user of the decrypted contents of the one or more decrypted packets in the secure communication session.

9. The network device of claim 8, further comprising employing the one or more key providers to provide the session key, wherein the one or more key providers include one or more of a client application, a server application, a session key broker, a hardware security module, a firewall, a proxy, a cache, or application delivery controller.

10. The network device of claim 8, wherein execution of the instructions instantiates an application to perform the actions, wherein the application is arranged as one or more of an application, a plugin for another application, or the application is integrated with one or more other applications.

11. The network device of claim 8, further comprising providing two or more different sets of the secure communication's other correlation information, wherein each of these sets include different types of other correlation information that are compatible with two or more different key providers.

12. The network device of claim 8, further comprising buffering the one or more packets for the secure communication session until the session key is provided.

13. The network device of claim 8, further comprising employing the session key to decrypt a portion or more of the one or more network packets.

14. The network device of claim 8, further comprising employing the network device to communicate one or more of the session key or the secure communication session's other correlation information to one or more other network devices, wherein the one or more other network device's employ the one or more of the communicated session key and other correlation information to decrypt the one or more network packets.

15. A system for monitoring communication over a network, comprising:
a network monitoring device (NMD), including:
a transceiver for communicating over the network;
a memory that stores instructions; and
one or more processors that execute the instructions to perform actions, including:
passively monitoring a secure communication session based on correlation information for one or more network packets;
providing a session key and other correlation information that corresponds to the secure communication session;
identifying a network connection flow that corresponds to the secure communication session based on a comparison of the secure communication session's other correlation information with other correlation information provided by one or more key providers, wherein contents of one or more encrypted packets in the secure communication session are decrypted; and
a client device, comprising:
another transceiver for communicating over the network;
another memory that stores other instructions;
one or more other processors that execute the other memory's instructions to perform further actions, including:
providing a display to a user of the decrypted contents of the one or more decrypted packets in the secure communication session, wherein the decrypted contents is provided by the NMD.

16. The system of claim 15, wherein the NMD's one or more processors' execution of the instructions instantiates an application to perform the actions, wherein the application is arranged as one or more of an application, a plugin for another application, or the application is integrated with one or more other applications.

17. The system of claim 15, wherein the NMD's one or more processors' execution of the instructions performs other actions comprising providing two or more different sets of the secure communication's other correlation information, wherein each of these sets include different types of other correlation information that are compatible with two or more different key providers.

18. The system of claim 15, wherein the NMD's one or more processors' execution of the instructions performs other actions comprising buffering the one or more packets for the secure communication session until the session key is provided.

19. The system of claim 15, wherein the NMD's one or more processors' execution of the instructions performs other actions comprising employing the session key to decrypt a portion or more of the one or more network packets.

20. The system of claim 15, wherein the NMD's one or more processors' execution of the instructions performs other actions comprising communicating one or more of the session key or the secure communication session's other correlation information to one or more other NMDs, wherein the one or more other NMD's employ the one or more of the communicated session key and other correlation information to decrypt the one or more network packets.

* * * * *